United States Patent
Kehrl

(10) Patent No.: US 9,327,757 B2
(45) Date of Patent: May 3, 2016

(54) ENERGY-ABSORBING DEFORMABLE TUBE

(71) Applicant: A&P Technology, Inc., Cincinnati, OH (US)

(72) Inventor: David J. Kehrl, Everett, WA (US)

(73) Assignee: A&P Technology, Inc., Cincinnati, OH (US)

( * ) Notice: Subject to any disclaimer, the term of this patent is extended or adjusted under 35 U.S.C. 154(b) by 0 days.

(21) Appl. No.: 14/210,899

(22) Filed: Mar. 14, 2014

(65) Prior Publication Data

US 2014/0302939 A1   Oct. 9, 2014

Related U.S. Application Data

(60) Provisional application No. 61/783,215, filed on Mar. 14, 2013.

(51) Int. Cl.
  *B62D 1/19*  (2006.01)
  *F16F 7/12*  (2006.01)

(52) U.S. Cl.
  CPC .. *B62D 1/192* (2013.01); *F16F 7/12* (2013.01)

(58) Field of Classification Search
  CPC .................................. B62D 1/192; F16F 7/12
  USPC .................... 464/172, 181, 183; 74/492, 493; 280/777
  See application file for complete search history.

(56) References Cited

U.S. PATENT DOCUMENTS

| | | | | |
|---|---|---|---|---|
| 639,071 | A * | 12/1899 | Lyall | 464/183 X |
| 3,468,182 | A * | 9/1969 | Shwartzberg | 74/492 |
| 3,508,633 | A * | 4/1970 | Nishimura et al. | 280/777 X |
| 4,531,619 | A * | 7/1985 | Eckels | 280/777 X |
| 4,589,679 | A | 5/1986 | Wackerle et al. | |
| 5,035,307 | A * | 7/1991 | Sadeghi et al. | 280/777 X |
| 6,148,865 | A | 11/2000 | Head | |
| 6,666,772 | B1 * | 12/2003 | Cheney et al. | 464/183 |
| 2008/0163716 | A1 * | 7/2008 | Battlogg et al. | 74/493 |

FOREIGN PATENT DOCUMENTS

| | | |
|---|---|---|
| JP | 4113041 | 4/1992 |
| JP | 5065069 | 3/1993 |
| JP | 2008-207696 A | 9/2008 |
| KR | 20-0149229 Y1 | 6/1999 |

* cited by examiner

*Primary Examiner* — Gregory Binda
(74) *Attorney, Agent, or Firm* — Lee & Hayes, PLLC

(57) ABSTRACT

An energy-absorbing deformable tube having a first end, a second end, and a reduced portion there between, a proximate tube portion between the reduced portion and the first end and a distal tube portion between the reduced portion and the second end, where a first cross section dimension in the reduced portion is smaller than a corresponding second cross section dimension in the proximal tube portion, distal tube portion, or both, and a cover spanning the reduced portion connected to the proximal tube portion and the distal tube portion, the cover provided over at least a portion of the reduced portion, the distal tube portion or the proximal tube portion or both moves relative to the cover after the deformable tube receives an axial force exceeding a predetermined threshold value.

20 Claims, 4 Drawing Sheets

ENERGY-ABSORBING DEFORMABLE TUBE

This application claims the benefit of U.S. provisional patent application 61/783,215, filed Mar. 14, 2013 and which is hereby incorporated herein by reference.

BACKGROUND

Steering wheel columns are typically provided in automobile and other vehicles to connect a steering wheel operated by a driver to a steering mechanism actuating the directional control of the vehicle. In certain applications, the steering columns are collapsible to absorb energy in a collision to reduce the force of impact on the driver. Prior developments in the art provide pyrotechnics and mechanical means to engage various energy-absorbing devices depending on the crash severity. However, it is not always desirable to use these types of steering columns. Other embodiments of prior collapsible steering columns rely on pneumatic components to control energy transfer during collapse or on plastic deformation of metallic components.

Features have also been added to prior steering columns in an attempt to maintain some vehicle steering function during and after a steering column collapse. Certain prior steering columns employed mechanical means such as sliding key and spline apparatus to provide steering control. Prior steering column technologies often added weight, complexity, and/or cost.

SUMMARY OF THE DISCLOSURE

Disclosed is an energy-absorbing deformable tube with a first end, a second end, and a reduced portion there between, where a first cross section dimension in the reduced portion is smaller than a corresponding second cross section dimension in the first end or second end or both, where the first end is operably attachable to a steering wheel and the second end is operably attachable to a steering mechanism, and a cover attached to the tube over at least a portion of the reduced portion.

DETAILED DESCRIPTION

Figure 1:
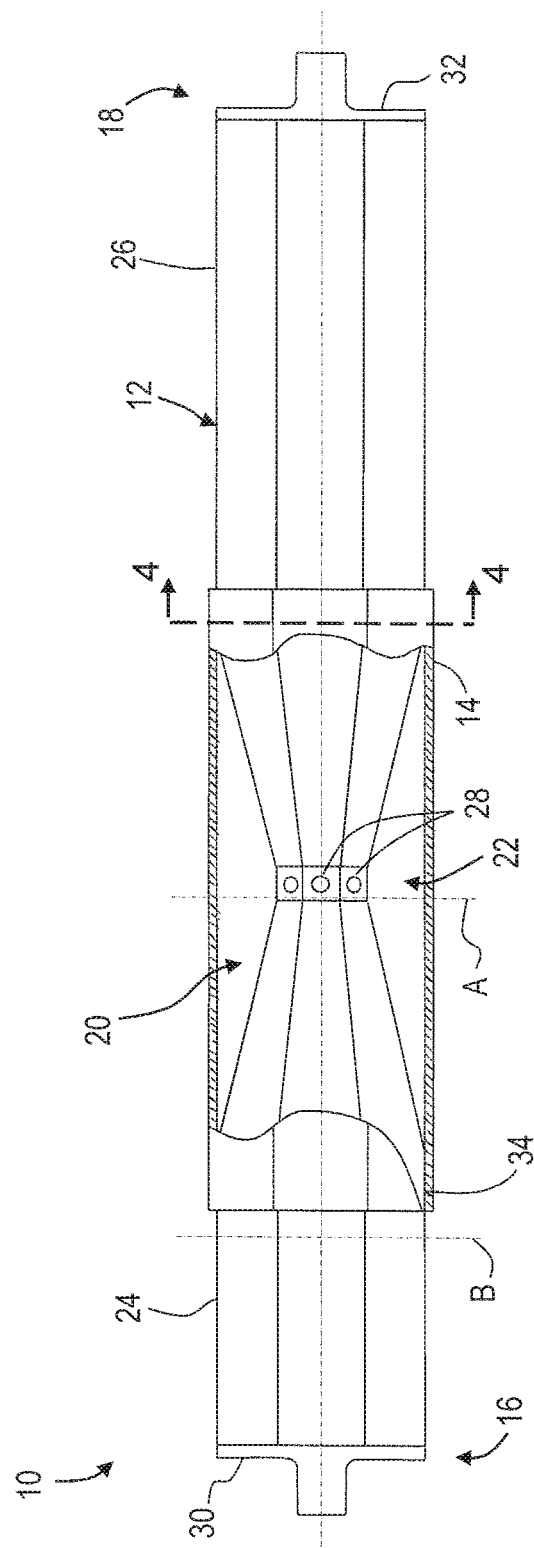
FIG. 1 is a plan view of an energy-absorbing deformable tube configured as a steering column shown with a portion of a cover cut away for clarity.

Referring now to FIG. 1, an energy-absorbing deformable tube is shown configured as a steering column 10 having a composite structure tailored to deform under an impact load, progressively requiring additional energy for further collapse after an initial failure event in response to a range of loads and impact energies. To provide a deformation under certain loads, the energy-absorbing deformable tube includes a crush zone providing features that are designed to deform under predetermined loads.

Figure 3:
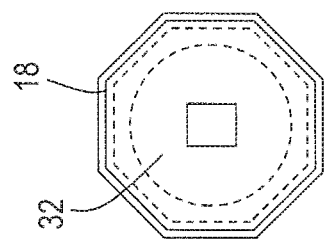
FIG. 3 is an opposite end view of the distal end of the steering column of FIG. 1.
Figure 2:
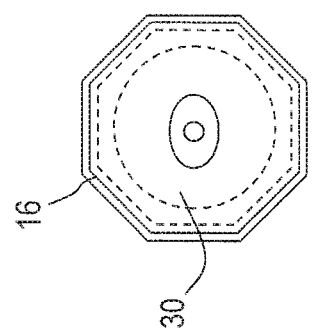
FIG. 2 is an end view of the proximal end of the steering column of FIG. 1.

The energy-absorbing deformable tube 12 has a first end 16, and a second end 18, and a reduced portion 20 forming a crush initiation zone 22 between the first and second ends. The first end 16, shown by example in FIG. 2 as a steering column, may be operably attached to a steering wheel assembly and during use in an automobile or other vehicle, is oriented adjacent or proximal to the driver. Accordingly, the second end 18, shown by example in FIG. 3, may be operably attached to a steering mechanism and during use in an automobile or other vehicle, is oriented distal to the driver. Stated another way, the deformable tube includes a proximal tube portion 24, a distal tube portion 26, and the reduced portion 20 between the proximal and distal tube portions. The length and cross-sectional shape of the proximal tube portion 24 may be the same as the length and cross-sectional shape of the distal tube portion 26. Alternatively, as shown in FIG. 1, the length of the proximal and distal tube portions may differ. Alternatively or additionally, the cross-sectional shape of the proximal and distal tube portions each may differ from the other as further discussed below.

A cover 14 is connected to the deformable tube 12 spanning the reduced portion 20 from the proximal tube portion 24 to the distal tube portion 26 covering at least a portion of the reduced portion. As shown by the embodiment of FIG. 1, the cover 14 is attached to the deformable tube 12 enclosing the entire reduced portion 20 to inhibit the ingress of moisture, dirt, and debris into the reduced portion 20. For certain applications, the cover 14 includes apertures, or otherwise only encloses a portion of the reduced portion 20. In other alternatives, the cover 14 may enclose more of the tube, and in some applications may cover the entire tube. Depending on the strength and energy-absorption required for the application, the cover may be strengthened to provide additional structural support, reinforcing the deformable tube 12 spanning the reduced portion between the proximal tube portion 24 and the distal tube portion 26, or may be a thin environmental cover with little structural effect.

In the embodiment shown in FIG. 1, the cover 14 is a tubular cover connected to the proximal tube portion 24 and the distal tube portion 26, releasably connected to the deformable tube 12 such that the distal tube portion moves relative to the cover after the deformable tube receives an axial force on the tube exceeding a predetermined threshold value. The strength of the bond between the cover and the proximal and distal tube portions may be selected as desired to achieve relative movement when the load on the deformable tube is above the desired threshold loading. Being releasably connected does not require the cover to separate from the distal tube portion, but the connections between the cover 14 and the distal tube portion 26 or the area adjacent the connection acts to shear, fracture, fold, deform, or otherwise release when an axial force on the deformable tube exceeds the predetermined threshold value providing relative movement between the distal tube portion and the cover. The deformable tube and cover subsequently progressively require additional energy for further collapse of the deformable tube 12 in response to the applied load. The amount of overlap of the cover over the proximal tube portion and over the distal tube portion, the type of connection between the cover and the tube portions, the strength of the connection between the cover and the tube portions, and the strength of the cover all may be selected as desired to achieve the bond strength, column strength, and energy-absorption required for the cover 14 and the deformable tube 12. For applications requiring protection from environmental factors, the bond between the cover and the deformable tube 12 provides a seal between the cover and the tube inhibiting ingress of moisture, dirt, and debris.

Figure 5:
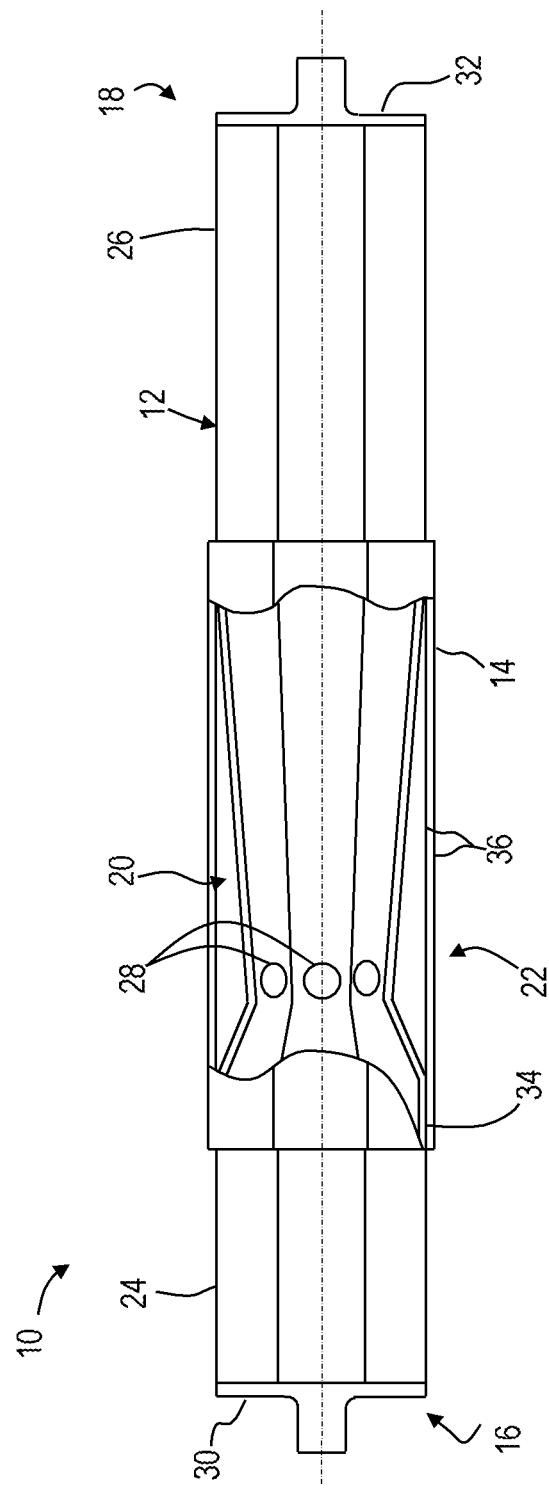
FIG. 5 is a plan view of an alternative embodiment of the energy-absorbing steering column shown with a portion of a cover cut away and a partial section through the steering column.
Figure 6:
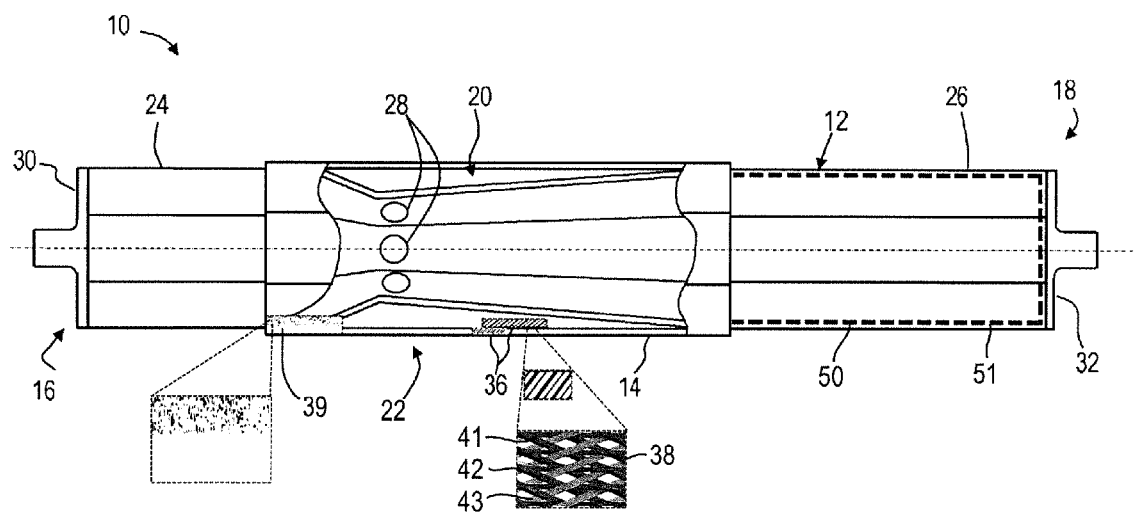
FIG. 6 is a plan view of an alternative embodiment of an energy-absorbing steering column shown with a portion of a cover cut away and a partial section through the steering column.

The bond between the cover and the deformable tube 12, shown between the cover and the proximal tube portion 24 in FIGS. 1 and 5 as bond 34, may be made by any means known to practitioners in the art including by, for example, an adhesive-based connection such as by thermoset or thermoplastic resins or epoxies or other adhesives; a mechanical connection such as by friction, fasteners, clips, interlocking features, or other mechanical connector; or other connection. In an embodiment such as that provided in, e.g., FIG. 6, an adhesive 39 is used. For certain applications, the connection between the cover 14 and the deformable tube 12 may be made by a friction fit or a compression fit between the cover and the deformable tube without the addition of an adhesive. In the embodiment shown in FIG. 1, the cover 14 as a tubular member is provided having inside dimensions larger than outside dimensions of the distal tube portion 26 such that when the distal tube portion releases by a threshold loading, the distal tube portion slides into the cover upon the application of further axial force.

In alternative embodiments, the cover 14 may be connected to the proximal tube portion 24 and the distal tube portion 26 such that the proximal tube portion moves relative to the cover after the deformable tube receives an axial load exceeding the predetermined threshold value. In yet another alternative, the cover 14 may be connected to the proximal tube portion 24 and the distal tube portion 26 such that the proximal tube portion moves relative to the cover after the deformable tube receives an axial force exceeding a first predetermined threshold value, and the distal tube portion moves relative to the cover after the tube receives an axial force exceeding a second predetermined threshold value, the first and second threshold values being selected for the requirements of the application as desired. In such various alternatives, the cover may be connected to the proximate tube portion and distal tube portion to provide relative motion between the cover and the proximate tube portion and/or distal tube portion as desired, as described above with respect to the distal tube portion.

The reduced portion 20 of the deformable tube 12 is provided with less strength than the strength of the proximal tube portion 24 and the distal tube portion 26. In this way, when the deformable tube receives a force exceeding a predetermined threshold, the reduced portion 20 will start to crush, crumple, fracture, fold, collapse or otherwise deform generally before the proximal or distal tube portions. The cross-sectional size and shape, the materials, material thicknesses, and material properties may be varied in the reduced portion to provide the desired load versus displacement curve. As shown in FIG. 1, a first cross-sectional dimension in the reduced portion, such as the width, height, perimeter, or other dimension of the cross section or feature of the cross section, is smaller than a corresponding second cross-sectional dimension in the proximal tube portion, distal tube portion, or both. The first cross-sectional dimension may be taken through any desired cross section through the reduced portion, for example through the line marked in FIG. 1 as "A", and the second cross-sectional dimension may be taken through any desired cross section through the proximal or distal tube portions as desired, for example through the line marked in FIG. 1 as "B" through the proximal tube portion 24. In the embodiment depicted in FIG. 1, the reduced portion tapers continuously between the second cross-sectional dimension and the first cross-sectional dimension.

The deformable tube 12 may include one or more operative features 28 for initiating deformation when a load exceeding a predetermined amount is applied to the tube. As used in this application, "operative features" means structural features that are designed to initiate, assist, or otherwise control the crushing, crumpling, fracturing, folding, collapsing or otherwise deforming of the energy-absorbing deformable tube upon receiving such predetermined loads in the tube. The operative features 28 include one feature or a combination of features such as apertures, slots, holes, serrations, grooves, creases; areas having selected materials; areas having selected material properties such as density, elongation, strength, hardness, or other material properties; areas of reduced or increased thickness; and other features adapted to locally alter the strength of the deformable tube. The deformable tube 12 may include one or more selected operative features, and may include one or more types of operative features either separately or in combination; for example, a combination of holes or slots through areas of reduced thickness provided in or adjacent the crush initiation zone 22. The operative features 28 used in the energy-absorbing deformable tube 12 may be positioned along the tube as desired to provide the deformation of the crush initiation zone 22 of the energy-absorbing deformable tube. In the embodiment of FIG. 1, for example, the operative features 28 are provided in a center portion of the crush initiation zone 22 of the reduced portion 20. The operative features may be selected based on the application in which the energy-absorbing deformable tube 12 is used and the performance under impact loading desired for the application, and will be tailored in size, shape, orientation, and position to control crush initiation under loads exceeding desired predetermined thresholds.

In the example of FIGS. 1 and 5, the operative features 28 are holes through the reduced portion 22. It is contemplated that various operative features 28 may be provided along or adjacent the reduced portion as desired. In certain embodiments, the cover 14 may also include various operative features assisting the collapsibility of the deformable tube under the desired predetermined loads.

The deformable tube 12 and the reduced portion 20 may have a generally circular cross-sectional shape. Alternatively, the deformable tube 12 and the reduced portion 20 may have a generally octagonal cross-sectional shape. In further embodiments, the deformable tube 12 and the reduced portion 20 may be generally hexagonal in cross section. A cross section of the deformable tube 12 and the reduced portion 20 may have any polygonal, annular, angular, or irregular cross-sectional shape as desired for an application without departing from the spirit of the invention. A cross-sectional shape of the proximal tube portion 24 may be different than a cross-sectional shape of the distal tube portion 26. A cross-sectional shape of the proximal tube portion 24 or the distal tube portion 26 may be different than a cross-sectional shape of the reduced portion 20. For example, in certain embodiments the deformable tube 12 is hexagonal in cross section, and the reduced portion 20 is circular in cross section. Alternatively, the cross-sectional shape of the deformable tube may vary along the length of the tube.

When used in an application such as a steering column, the deformable tube 12 may include one or more portions corresponding to a clamp or other fixture operable to attach the steering column to the vehicle. The portions corresponding to a clamp or other fixture may have a circular cross-sectional shape, or other shape as desired to operate with the clamp or fixture to attach the steering column. The cross-sectional shape of the deformable tube along the portions corresponding to a clamp or other fixture may be different than the cross-sectional shape of other portions of the tube.

Figure 4:
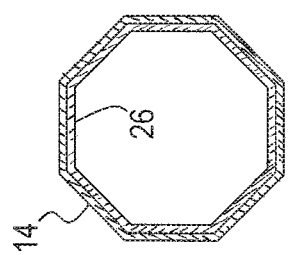
FIG. 4 is a cross-sectional view of the steering column of FIG. 1 through section 4-4.

In a steering column application, for example, it is desirable to maintain some vehicle steering function during and possibly after a steering column collapse. In the embodiment shown in FIG. 1, the cover 14 acts to inhibit relative rotation between the proximal tube portion 24 and the distal tube portion 26. To inhibit relative rotation between the cover and tube portions, the cross-sectional shape of the cover 14 interlocks in a rotational direction with the proximal tube portion 24 and the distal tube portion 26. As shown in FIG. 4, the cross-sectional shapes of the distal tube portion 26 and the cover 14 are octagonal. As the distal portion collapses into and moves inside of the cover, the octagonal shape of the cover 14 inhibits relative rotation of the nested octagonal shape of the distal tube portion as the distal tube portion translates within the cover. The proximal tube portion 24, the distal tube portion 26, and the cover 14 may have any polygonal, angular, keyway, or irregular cross-sectional shape as desired inhibiting relative rotation between the cover and the proximal tube portion 24 and/or the distal tube portion 26.

As shown in FIGS. 1 and 5, the deformable tube 12 is designed such that the diameter of a cross section of the reduced portion 20 is smaller than the diameter of a cross section of the first end 16, or the second end 18, or both. In some embodiments, the reduced portion 20 is located approximately midway between the first end 16 and the second end 18. In other embodiments, the reduced portion 20 is located adjacent the first end 16, while in yet other embodiments the reduced portion is located adjacent the second end 18.

In some embodiments, the diameter of a cross section of the proximal tube portion 24 is equal to the diameter of a cross section of the distal tube portion. In other embodiments, the diameter of a cross section of the proximal tube portion 24 is unequal to the diameter of a cross section of the distal tube portion 26 as desired for the application.

The embodiments of FIGS. 1 and 5 show the reduced portion including the crush initiation zone 22. The crush initiation zone may be positioned at or adjacent the smallest diameter of the reduced portion. Here, the diameter means the cross sectional dimension along the reduced portion, whether or not the cross sectional shape is a circle. The reduced portion may taper towards the crush initiation zone 22 as shown in FIGS. 1 and 5 such that the cross sectional diameter gradually decreases towards the crush initiation zone 22 from both the proximal tube portion 24 and the distal tube portion 26. Alternatively, the reduced portion may decrease in dimension in a step-wise fashion. In yet another alternative, the reduced portion may decrease in dimension in an arcuate slope. The crush initiation zone 22 may be located in the reduced portion 20 midway between the proximal tube portion 24 and the distal tube portion 26 such as shown in FIG. 1. Alternatively, as shown in FIG. 5, the crush initiation zone 22 may be located closer to the proximal tube portion 24 adjacent the first end 16. In yet another alternative, the crush initiation zone 22 may be located closer to the distal tube portion 26 adjacent the second end 18.

In the embodiment shown in the figures, the steering column 10 includes a steering wheel attachment fitting 30 positioned at the first end of the tube. Additionally, the steering column 10 includes a steering gear attachment fitting 32 positioned at the second end of the tube.

The deformable tube 12 and the cover 14 are made of a composite structure formed of one or more fiber-reinforced resin layers. The fiber layers may include chopped fibers, continuous longitudinally aligned fibers, circumferentially wound fibers, a woven or braided pattern, or any other desired reinforcing pattern, sleeves, and/or fabrics. Each fiber layer may include differing fiber reinforcing patterns and composition as may be desired.

In one example, the deformable tube is formed with two layers of triaxial overbraid, and may have a third ply of triaxial braid over all or a portion of the tube. As discussed below with respect to, e.g., FIG. 6, the triaxial braid includes fibers in two bias directions and one axial direction, where the axial fibers are approximately aligned with the longitudinal axis of the tube. In an alternative construction, the deformable tube has two biaxial sleeves and a uniaxial material sandwiched in between the two biaxial sleeves, the uniaxial fibers being approximately aligned with the longitudinal axis of the tube. Various constructions are contemplated as desired for the requirements of the application, and may include predetermined layers of wound fibers or predetermined layers of one or more of uniaxial, biaxial, triaxial, or other braided fibers, prepreg tapes, prepreg filaments, prepreg fabrics, filament winding, and any desired combination thereof as desired for the application. Prepreg materials are preimpregnated with resin, such as coated, twined with, or otherwise containing an unmelted composite resin that is provided with the fiber for subsequent processing. The fibers may be provided in a tubular sleeve. Alternatively, the fibers may be braided over a mandrel 50 forming the tube. In other embodiments, the layer is unbraided. In an alternative example, circumferentially wound fibers may be applied by filament winding techniques. In yet another alternative, layers of fiber may be provided by placing a desired selection of prepreg tapes, prepreg filaments, and prepreg fabrics by known techniques in one or more layers over a shaped mandrel, and subsequently curing the prepreg resin. The fiber layers may include one or any of a combination of fiber materials including carbon, fiberglass, glass, aramid, rayon, biofibers, or any other natural or synthetic fiber providing the material properties desired for the application.

In one example, the deformable tube is made by providing one or more fiber layers around a mandrel 50 having a shape corresponding to the desired interior dimensions of the deformable tube. The fiber wrapped mandrel 50 may be placed in a mold or die cavity defining the exterior dimensions of the deformable tube, wherein resin is introduced into the fiber using well known methods, such as resin transfer, gravity feeding or resin film infusion. Finally the parts are consolidated and/or cured, in a heated mold, oven or autoclave, typically under vacuum or pressure conditions. Alternatively, the fiber layer may be pre-impregnated with resin prior to being overlaid on the mandrel 50, where the pre-impregnated fiber is cured in an autoclave. In certain embodiments, the mandrel 50 may be a foam core 51, such as a polyurethane, polyisocyanurate, polystyrene, or other foam, that may be left in the deformable tube after the resin is cured. Alternatively, the mandrel 50 is removed from the inside of the deformable tube after the resin is cured.

When the deformable tube includes a foam core, the density of the foam in the deformable tube may be selected as desired to change the deformation response to an impact force. For example, the density of the foam core may be approximately 2 lb/ft$^3$, or less. In another example, the density of the foam core may be approximately 10 lb/ft$^3$. The density of the foam core may be between about 2 and 10 lb/ft$^3$, or greater, as desired.

The resin in the fiber-reinforced layer may be one or any combination resins known in the art, including thermoset or thermoplastic resins. For example, the resin may be a thermoplastic resin such as PPS, PEEK, PEKK, PEI, Nylon, Polypropylene, or thermoplastic urethane. In other embodiments the resin may be one or any combination of thermoset resin, for example, epoxy, vinyl ester, and polyurethane.

Multiple layers of fiber reinforcing of the same or differing composition may be braided or otherwise provided on the mandrel. In one example, the tube may be formed using the method disclosed in U.S. Pat. No. 6,148,865. Each layer may or may not extend along the longitudinal length of the deformable tube, thereby allowing for variation in fiber thickness, pattern, and composition to be built up along the deformable tube using an automatic or semi-automatic process.

The energy-absorbing steering column 10 is used in automobiles and other vehicles. In normal operation the loads applied to the steering column are within approximately linear elastic stress-strain properties. In a collision with another vehicle or object, crash loads applied to the steering column may cause loads on the column to exceed the predetermined threshold value causing the column to deform, absorbing a portion of the energy of the impact. Additionally, the present steering column provides a variable energy absorption curve such that an increasing amount of energy is absorbed as the column progressively collapses.

When the vehicle is involved in a collision, the driver of the vehicle will typically remain in motion until he strikes his seatbelt and/or the steering wheel of the automobile. Alternatively or additionally, an impact may cause the steering mechanism at the distal end of the steering column to forcibly deflect upwardly against the end of the steering column. The energy-absorbing steering column is designed to collapse under the impact loads on the steering column. As an impact force transmits into the steering column of the automobile, the energy-absorbing steering column is designed to absorb some of the force by creating an intentional deformation and collapse. When the steering column is subjected to an impact force exceeding a predetermined threshold value, the attachment of the cover 14 to the deformable tube 12 will release. Then, the proximal and distal tube portions 24, 26 will transmit force to the reduced portion 20 causing the reduced portion to deform, typically starting at the operative features 28 of the crush initiation zone 22. As the crush initiation zone 22 and reduced portion 20 collapses, the steering column 10 folds or deforms. The composite columns can be tailored by design of the shape and size of the cross section, the number and thickness of fiber layers, and fiber angle to progressively require more energy to collapse the column further after the initial failure as it collapses upon itself absorbing energy applied to the steering column to reduce the amount of force transmitted to the driver.

In embodiments, a reduced portion can comprise two or more crush initiation zones. In alternative or complementary embodiments, the operative features of the crush initiation zone(s) are arranged annularly about the reduced portion. In still further alternative or complementary embodiments, a deformable tube can include resilient fibers transverse to and at least partially braided with the axial fibers.

Components herein can be constructed in various layers. FIG. 5 shows layers 36 of deformable tube 12. In at least one embodiment, the deformable tube comprises a fiber-reinforced resin layer. In a further embodiment, the fibers in the fiber-reinforced resin layer are selected from the group consisting of carbon, glass, aramid, and combinations of two or more thereof. In an alternative or complementary further embodiment, the fibers in the fiber-reinforced layer are at least partially braided. Tri-axial braid 38, shown in close up from layers 36, illustrates a non-limiting example of axial fibers 41 and bias fibers 42 and 43 comprising triaxial braid 38. Axial fiber 41 is shown axially aligned relative to a longitudinal axis of the tube in the example illustrated. Bias fibers 42 and 43 are at least partially transverse to the axial fibers 41. In another alternative or complementary further embodiment, fibers in the fiber-reinforced resin layer form a tubular sleeve. In yet another alternative or complementary further embodiment, the fibers (e.g., 41, 42, 43) in the fiber-reinforced resin layer are circumferentially wound around the tube. In still another alternative or complementary further embodiment, the fibers in the fiber-reinforced resin layer are axially-aligned relative to a longitudinal axis of the tube. In a further embodiment, resilient fibers transverse to and at least partially braided with the axial fibers.

While the foregoing description has described a deformable tube for use as a steering column, it is contemplated that the present deformable tube is useful in various structural applications requiring energy absorption upon a threshold load. In certain applications, the present deformable tube may be provided as a torque transmission shaft, drive shaft, power take-off shaft, or other rotating shaft, or may be used in various structural applications.

While the invention has been illustrated and described in detail in the drawings and foregoing description, the same is to be considered as illustrative and not restrictive in character, it being understood that exemplary embodiments have been shown and described and that all changes and modifications that come within the spirit of the invention are desired to be protected by the appended claims and the equivalents thereof.

What is claimed is:

1. An energy-absorbing deformable tube comprising:
   a first end,
   a second end,
   a reduced portion between the first end and the second end,
   a proximate tube portion between the reduced portion and the first end, and
   a distal tube portion between the reduced portion and the second end,
   where a first cross-sectional dimension in the reduced portion is smaller than a corresponding second cross-sectional dimension in at least one of the proximal tube portion or the distal tube portion, the reduced portion tapers continuously between the second cross-sectional dimension and the first cross-sectional dimension, and
   a cover spanning the reduced portion connected to the proximal tube portion and the distal tube portion, the cover provided over at least a portion of the reduced portion,
   the distal tube portion or the proximal tube portion or both moves relative to the cover after the deformable tube receives an axial force exceeding a predetermined threshold value crushing the deformable tube,
   the cover inhibits relative rotation between the distal tube portion and the proximal tube portion after the deformable tube receives the axial force exceeding the predetermined threshold value.

2. The deformable tube of claim 1, where the reduced portion comprises a crush initiation zone having one or more operative features adapted to deform when the deformable tube receives the axial force exceeding the predetermined threshold value.

3. The deformable tube of claim 2, where the crush initiation zone is located adjacent the first cross section dimension of the reduced portion.

4. The deformable tube of claim 2, where the operative features of the crush initiation zone are arranged annularly about the reduced portion.

5. The deformable tube of claim 1, where after receiving the axial force exceeding the predetermined threshold value the deformable tube progressively requires additional energy for further collapse of the deformable tube in response to the applied load.

6. The deformable tube of claim 5, the further collapse is based on a load versus displacement curve defining an amount of further collapse in the reduced portion due to the additional energy.

7. The deformable tube of claim 1, where the cover encircles the reduced portion sealed to the deformable tube inhibiting moisture, dirt, or debris ingress to the reduced portion.

8. The deformable tube of claim 1, where the cover is connected to the deformable tube by at least one of an adhesive, a friction fit, or a compression fit.

9. The deformable tube of claim 1, where a diameter of the proximate tube portion and the distal tube portion are substantially the same.

10. The deformable tube of claim 1, where the cover interlocks in a rotational direction with the proximal tube portion and the distal tube portion.

11. The deformable tube of claim 10, the at least a portion of the cover interlocking with the distal portion and the proximal portion has a polygonal cross-sectional shape, and portions of the distal portion and the proximal portion in contact with the cover have similar polygonal cross-sectional shapes.

12. The deformable tube of claim 1, where the deformable tube comprises a fiber-reinforced resin layer.

13. The deformable tube of claim 12, where the fibers in the fiber-reinforced resin layer are selected from the group consisting of carbon, glass, aramid, and combinations of two or more thereof.

14. The deformable tube of claim 12, where the fibers in the fiber-reinforced layer are at least partially braided.

15. The deformable tube of claim 12, where fibers in the fiber-reinforced resin layer form a tubular sleeve.

16. The deformable tube of claim 12, where the fibers in the fiber-reinforced resin layer are axially-aligned relative to a longitudinal axis of the tube.

17. The deformable tube of claim 16, further comprising resilient fibers transverse to and at least partially braided with the axial fibers.

18. The deformable tube of claim 12, where the fibers in the fiber-reinforced resin layer are circumferentially wound around the tube.

19. The deformable tube of claim 12, further comprising a mandrel over which the fiber-reinforced resin layer is formed.

20. The deformable tube of claim 19, the mandrel comprises a foam core having a density between 2 $lb/ft^3$ and 10 $lb/ft^3$.

* * * * *